US008234015B2

(12) United States Patent
Bech et al.

(10) Patent No.: US 8,234,015 B2
(45) Date of Patent: Jul. 31, 2012

(54) METHOD FOR CONTROLLING A GRID VOLTAGE

(75) Inventors: John Bech, Hammel (DK); Peter Nielsen, Fredericia (DK); Philip Carne Kjaer, Arhus C (DK)

(73) Assignee: Vestas Wind Systems A/S, Aarhus (DK)

( * ) Notice: Subject to any disclaimer, the term of this patent is extended or adjusted under 35 U.S.C. 154(b) by 7 days.

(21) Appl. No.: 12/809,722

(22) PCT Filed: Dec. 17, 2008

(86) PCT No.: PCT/EP2008/067697
§ 371 (c)(1),
(2), (4) Date: Dec. 17, 2008

(87) PCT Pub. No.: WO2009/083448
PCT Pub. Date: Jul. 9, 2009

(65) Prior Publication Data
US 2011/0043186 A1    Feb. 24, 2011

Related U.S. Application Data

(60) Provisional application No. 61/009,599, filed on Dec. 28, 2007.

(30) Foreign Application Priority Data

Dec. 28, 2007  (DK) ................................. 2007 01882

(51) Int. Cl.
*G05D 3/12*   (2006.01)
*G05D 5/00*   (2006.01)
*G05D 11/00*  (2006.01)
*G05D 17/00*  (2006.01)
(52) U.S. Cl. ......... 700/292; 700/286; 700/293; 700/298

(58) Field of Classification Search ............... 323/205, 323/207, 209, 210; 290/44, 55; 307/45, 307/65, 69, 84; 700/286–287, 292, 293, 700/298
See application file for complete search history.

(56) References Cited

U.S. PATENT DOCUMENTS
4,916,377 A    4/1990  Terada et al.
(Continued)

FOREIGN PATENT DOCUMENTS
DE    102004048341 A1    4/2006
EP        1841037 A2    10/2007

OTHER PUBLICATIONS

The impact of induction generator and PWM Inverter with energy storage on weak grids, Bludszuweit et al., printed from Internet on Dec. 15, 2011, 8 pages.*

(Continued)

*Primary Examiner* — Ronald Hartman, Jr.
(74) *Attorney, Agent, or Firm* — Wood, Herron & Evans, LLP

(57) ABSTRACT

The present invention relates to a method for controlling a voltage level of a power supply grid operationally connected to a source of electrical power, the method comprising the steps of determining a short circuit impedance of the power supply grid at a point of common coupling, calculating, using the determined short circuit impedance, a gain value of the power supply grid, and controlling the grid voltage level in accordance with the calculated gain value by applying said gain value as a gain parameter in a voltage controller. The method according to the present invention may be implemented as a method for configuring a voltage controller once and for all, or it may be implemented as a method for adaptively adjusting a gain of a voltage controller.

20 Claims, 3 Drawing Sheets

U.S. PATENT DOCUMENTS

| | | | | |
|---|---|---|---|---|
| 5,465,203 | A | * | 11/1995 | Bhattacharya et al. ......... 363/40 |
| 5,757,099 | A | * | 5/1998 | Cheng et al. ................. 307/105 |
| 6,359,423 | B1 | * | 3/2002 | Noro ............................. 323/208 |
| 6,573,691 | B2 | * | 6/2003 | Ma et al. ...................... 323/209 |
| 6,603,290 | B2 | * | 8/2003 | Hochgraf ........................ 322/37 |
| 6,670,721 | B2 | * | 12/2003 | Lof et al. ........................ 290/44 |
| 6,794,855 | B2 | * | 9/2004 | Shimomura et al. ............ 322/59 |
| 6,858,953 | B2 | * | 2/2005 | Stahlkopf ....................... 290/44 |
| 7,091,703 | B2 | * | 8/2006 | Folts et al. .................... 323/207 |
| 7,116,010 | B2 | * | 10/2006 | Lasseter et al. ................ 307/45 |
| 7,680,562 | B2 | * | 3/2010 | Delmerico et al. ........... 700/297 |
| 7,855,526 | B2 | * | 12/2010 | Ohnishi et al. ................ 318/800 |
| 7,989,974 | B2 | * | 8/2011 | Fortmann et al. .............. 290/44 |
| 2007/0228838 | A1 | * | 10/2007 | Delmerico et al. ............ 307/84 |
| 2007/0241759 | A1 | | 10/2007 | Williams |
| 2010/0091417 | A1 | * | 4/2010 | Letas ............................. 361/21 |
| 2011/0260739 | A1 | * | 10/2011 | Garcia et al. ................. 324/652 |

OTHER PUBLICATIONS

Short Circuit Impedance Measurment, Pederson et al., IEEE Proc.-Gener. Transm. Distrib., vol. 150, No. 2, Mar. 2003, 6 pages.*

STATCOM solutions for Wind Warms, Meeting the grid code, ABB, 2008, printed from Internet on Dec. 15, 2011, 8 pages.*

Identification of Grid Impedance for Purposes of Voltage Feedback Active Filtering, IEEE Power Electronics Letters, vol. 2, No. 1, Mar. 2004, Tarkiainen et al., 5 pages.*

European Patent Office, International Search Report issued in related International Application No PCT/EP2008/067697 dated Oct. 26, 2009.

The International Bureau of WIPO, International Preliminary Report on Patentability issued in related International application No. PCT/EP2008/067697 dated Jun. 29, 2010.

Timbus, et al., "Grid Impedance Identification Based on Active Power Variations and Grid Voltage Control", Industry Applications Conference, 2007. 42nd IAS Annual Meeting. Conference Record of the 2007 IEEE.

Danish Patent and Trademark Office, translation of Office Action and Search Report dated Jul. 9, 2008.

* cited by examiner

METHOD FOR CONTROLLING A GRID VOLTAGE

FIELD OF THE INVENTION

The present invention relates to a grid voltage control method for wind power plant installations. In particular, the present invention relates to control methods where a change in an amount of electrical power injected into a power supply gird changes the grid voltage level. Depending on the grid characteristics the injected electrical power can be active or reactive power.

BACKGROUND OF THE INVENTION

Grid code demands for power supply grids become more and more strict. These higher grid code demands require higher performances of wind power plants electrically connected to such power supply grids.

It may be seen as an object of embodiments of the present invention to provide a method for adaptive grid voltage control in order to fulfill strict grid code demands.

DESCRIPTION OF THE INVENTION

The above-mentioned object is complied with by providing, in a first aspect, a method for controlling a voltage level of a power supply grid operationally connected to a source of electrical power, the method comprising the steps of
 determining a first short circuit impedance of the power supply grid at a point of common coupling,
 calculating, using the determined first short circuit impedance, a first gain value of the power supply grid, and
 controlling the grid voltage level in accordance with the calculated first gain value by applying said first gain value as a gain parameter in a voltage controller.

Thus, according to the first aspect of the present invention, a grid voltage of a power supply grid may be controlled by varying an amount of electrical power, active or reactive, injected into such power supply grid. Grid voltage control using active power may be of particular relevance in connection with weak or isolated power grids.

Several advantages are associated with the present invention. Firstly, very strict grid code demands can be meet. In addition, wind power plants can be operated at weaker power supply grid if the principle of the present invention is applied. A wind power plant is defined as a group of at least two wind turbines having a common electrical output through which active or reactive power may be injected into an associated power supply grid.

Moreover, advantages such as
 fast dynamic response independent of actual grid configuration,
 minimal voltage overshoot,
 dead-beat control performance of entire wind power plants, and
 adaptive controllers for ensuring equal performance independent of grid conditions
are associated with the present invention.

According to the method of the first aspect of the present invention the step of controlling the grid voltage level may comprise the step of calculating an amount of electrical power to be injected into the power supply grid from the source of electrical power in accordance with the calculated first gain value of the power supply grid. Following this, a step of injecting, from the source of electrical power, the calculated amount of electrical power into the power supply grid in order to control the grid voltage level accordingly may be provided.

Moreover, the method may further comprise the steps of
 determining a second short circuit impedance of the power supply grid at the point of common coupling,
 calculating, using the determined second short circuit impedance, a second gain value of the power supply grid, and
 controlling the grid voltage level in accordance with the calculated second gain value by replacing the first gain value with the second gain value as the gain parameter in the voltage controller.

Again, the step of controlling the grid voltage level may comprise the step of calculating an amount of electrical power to be injected into the power supply grid from the source of electrical power in accordance with the calculated second gain value of the power supply grid, and injecting, from the source of electrical power, the calculated amount of electrical power into the power supply grid in order to control the grid voltage level accordingly.

Thus, the gain parameter of the voltage controller may be updated or adjusted at regular intervals by determined the short circuit impedance of the power supply grid at similar regular intervals. In this way the gain parameter of the voltage controller is adjusted in an adaptive manner thereby insuring that said gain parameter matches the electrical characteristics of the power supply grid.

A gain of the power supply grid is typically defined as a voltage change, $\Delta V$, per electrical power unit, MW or MVAr, injected into the power supply grid.

The point of common coupling may be positioned along a transmission line connecting the source of electrical power and the power supply grid. Typically, the point of common coupling is defined as the point where the source of electrical power is electrically connected to the power supply grid. The point of common coupling may be positioned relatively close to the wind power plant or it may be positioned at a remote position relative to the wind power plant.

The step of determining the short circuit impedance may involve measurements of a voltage level and a current level at the point of common coupling, wherein the measured voltage and current levels are associated voltage and current levels.

The source of electrical power may comprise one or more wind turbines capable of generating the required electrical power. Alternatively or in addition, the source of electrical power may comprise a STATCOM, switched capacitors, a SVC installation or a combination thereof.

As previously mentioned the source of electrical power may comprise a source of active power so that electrical power injected into the power supply grid in order to control the grid voltage level comprises active power. Grid voltage control using active power is of particular relevance in connection with weak power supply grids.

Alternatively, or optionally in addition, the source of electrical power may comprise a source of reactive power so that electrical power injected into the power supply grid in order to control the grid voltage level comprises reactive power.

In a second aspect, the present invention relates to a method for determining a process gain of a voltage controller for controlling a voltage level of a power supply grid operationally connected to a source of electrical power, the method comprising the steps of determining a short circuit impedance of the power supply grid at a point of common coupling, calculating, using the determined short circuit impedance, a gain value of the power supply grid, and applying said gain value as the process gain of the voltage controller.

Thus, according to the second aspect of the present invention the gain of the power supply grid determined at the point of common coupling is incorporated into the voltage controller. An integrator may optionally be provided to improve steady state performance. Using before-hand knowledge of the available amount of electrical power, optionally from a number of wind turbines or one or more STATCOMs, the grid voltage can be controlled by varying the amount of electrical power injected into the power supply grid. The method according to the second aspect of the present invention may be considered an off-line implementation of the present invention in that the gain of the voltage controller is only determined once, namely at configuration of the voltage controller.

The point of common coupling may be positioned along a transmission line connecting the source of electrical power and the power supply grid.

The source of electrical power may comprise a source of active power and/or a source of reactive power.

As stated in connection with the first aspect of the present invention, the step of determining the short circuit impedance may involve measurements of a voltage level and a current level at the point of common coupling, wherein said measured voltage and current levels are associated voltage and current levels.

BRIEF DESCRIPTION OF THE DRAWINGS

The present invention will now be described in further details with references to the accompanying figures where.

Figure 1:
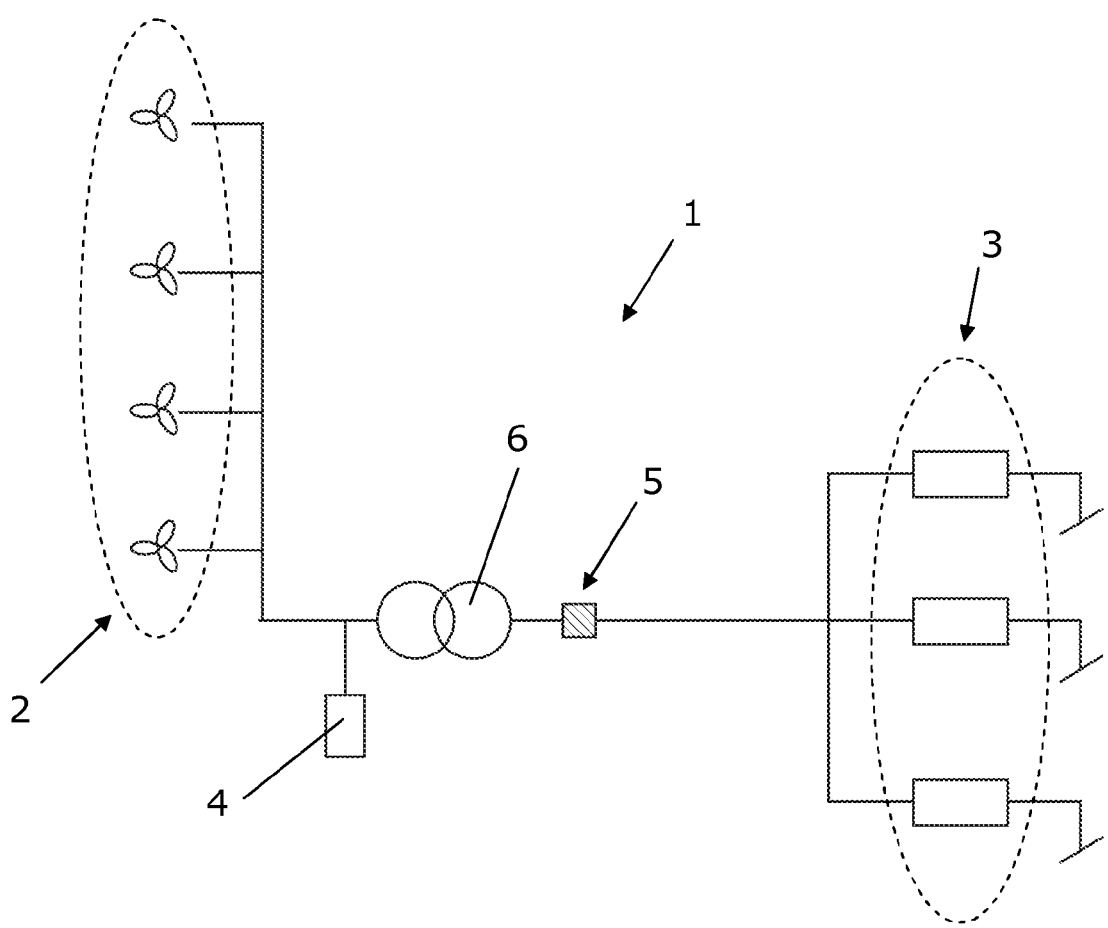
FIG. 1 shows a power supply grid.

While the invention is susceptible to various modifications and alternative forms, specific embodiments have been shown by way of example in the drawings and will be described in details herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE DRAWINGS

In its broadest aspect the present invention relates to a method for establishing one or more suitable control parameters for a voltage controller in order to control a grid voltage of a power supply grid operationally connected to a source of electrical power. The source of electrical power can be a source of reactive power or a source of active power.

In the following, the present invention will be disclosed with reference to an embodiment involving injection of reactive power into a power supply grid in order to control the grid voltage of the power supply grid. However, the present invention also covers injection of active power into for example weak power supply grids for the purpose of controlling the grid voltage of such weak power supply grids.

The source of electrical power can involve wind turbines or other suitable sources, such as a STATCOM, switched capacitors or SVC installations. In particular, the present invention relates to a method for determined a gain parameter of a voltage controller, said gain parameter being determined using knowledge of a short circuit impedance of the power supply grid at a point of common coupling. Thus, the gain of the power supply grid at the point of common coupling is incorporated into the voltage controller, optionally in combination with an integrator to improve steady state performance. The gain of the power supply grid is determined from the short circuit power in combination with the ratio X/R—the latter being derivable from the short circuit impedance of the power supply grid.

Using before-hand knowledge of the available amount of reactive power, optionally from a number of wind turbines or one or more STATCOMs, the grid voltage can be controlled by varying the amount of reactive power injected into the power supply grid. The above-mentioned method may be considered an off-line implementation of the present invention in that the gain of the voltage controller is only determined once—at configuration of the voltage controller.

The present invention can also be implemented as an on-line configuration where the short circuit impedance and the gain of the power supply grid is determined at regular intervals. Again, the gain of the power supply grid is determined from the short circuit power in combination with the ratio X/R—the latter being derivable from the short circuit impedance of the power supply grid. Thus, the on-line configuration of the present invention facilitates continuous updating of the gain of the voltage controller. This is a huge advantage if the grid conditions changes dramatically, for example if a part or parts of the power supply grid collapses, tripping of grid lines or reconfiguration of a grid.

The principles of the present invention will now be described in further details. When running a wind power plant in a voltage control mode, the reactive power from the wind turbines are injected into an associated power supply grid at a point of common coupling (PCC) in order to control the grid voltage. The PCC is where the wind power plant is electrical connected to the power supply grid.

The so-called gain of the power supply grid is strongly dependent on the short circuit impedance of the power supply grid. The gain of the power supply grid is defined as a voltage change per reactive power (MVAr) injected into the power supply grid.

The short circuit impedance of the power supply grid is defined as $Z_g=R_g+jX_g=R_g+j2\pi fL$, where $R_g$ and $X_g$ are the real and imaginary parts of the grid impedance, respectively, j is the imaginary operator, f is the frequency (typically the nominal frequency of the power supply grid) and L is the inductance. The short circuit impedance can be used as the impedance in a Thevinin equivalent. The short circuit impedance will of course vary for higher order harmonics since L is frequency dependant.

By continuously measuring the voltages and currents in the PCC the short circuit impedance of the power supply grid can be estimated and thereby an on-line estimation of grid parameters is possible. Other techniques, such as for example Wide Area Measurement Systems (WAMS) or Phase Measurement Unit (PMU) are also suitable techniques for determining the short circuit impedance.

Knowing R and X of the power supply grid, a backwards calculation can be performed in order to estimate the process-gain of a voltage control. This knowledge can be used in a voltage controller as a gain-scheduling factor in order to maintain the system's dynamic performance even though the grid parameters are changed, for example if part of the power supply grid collapses.

Alternatively, the short circuit impedance and the associated gain of the power supply grid can be used to design a feed-forward controller prompting for the reactive power needed to achieve a steady-state voltage reference. A slow integrator can operate in parallel to this feed-forward controller to improve steady state performance.

Referring now to FIG. 1 a power supply grid 1 including a wind power plant 2 and a number of power consumers 3 is depicted. The wind power plant may for example be capable of producing electrical power within the range 50-200 MW or higher. The wind power plant is also capable of delivering reactive power to the power supply grid if demands to require. An additional reactive power source 4 in the form of a STATCOM is also provided. The capacity of the STATCOM may for example be up to 200 MW of reactive power. Thus, if the grid code of the power supply grid requires that the grid voltage should be increased reactive power may be provided to the grid from the wind power plant, the STATCOM or both. Typically, the STATCOM will be capable of delivering reactive power to the power supply grid with a shorter notice than the wind power plant. Thus, a possible scenario could be that reactive power is provided in a sequential manner by first supplying reactive power from the STATCOM and, at a later stage, supplying reactive power from the wind power plant.

As previously stated the reactive power from the wind power plant or the STATCOM is injected into a power supply grid at the PCC. The PCC, marked with reference numeral 5 in FIG. 1, is where the wind power plant is electrical connected to the power supply grid. Optionally, a grid transformer 6 may be provided between the reactive power sources (wind power plant and STATCOM) and the power supply grid.

By determining R and X of the short circuit impedance at the PCC 5, the gain of the power supply grid can be calculated and applied as a process gain parameter in a voltage controller. If the gain of the power supply grid is determined at regular intervals, and the process again of the voltage controller is updated accordingly, an on-line and thereby adaptive voltage control loop is established. Preferably, an integrator having a time constant of 10-100 ms is provided for improving steady state performance.

Figure 2:
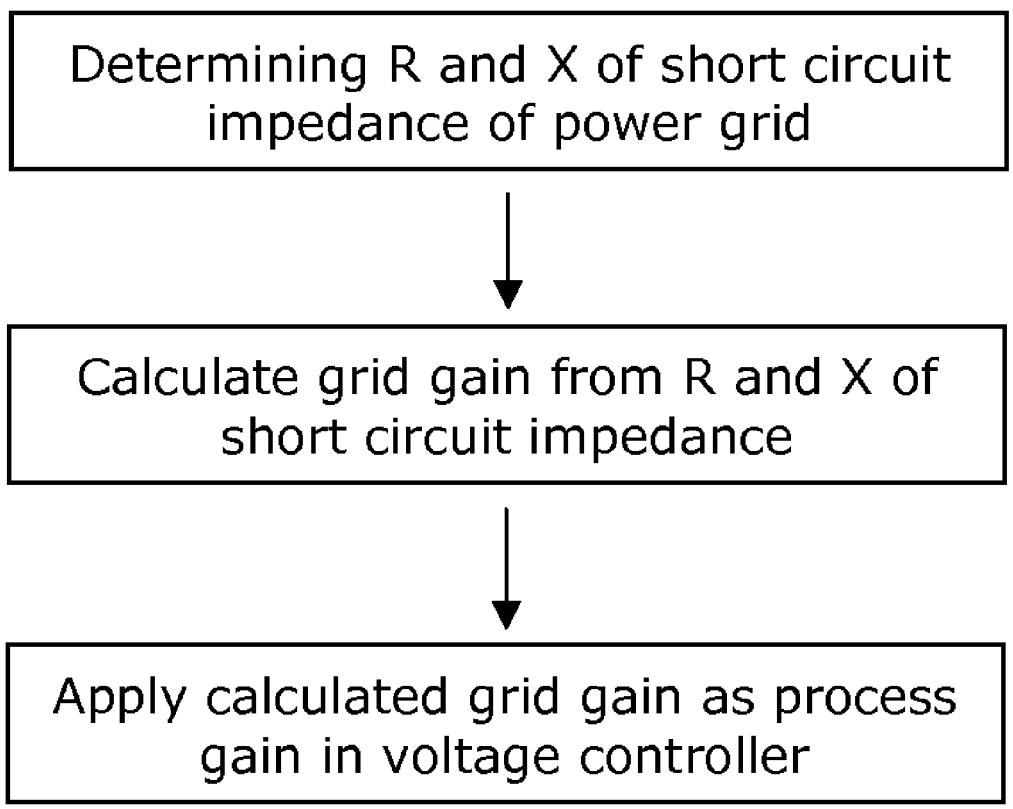
FIG. 2 shows a simplified flow chart.

Referring now to FIG. 2 a simple flow chart is depicted. As depicted in FIG. 2, R and X of the Thevinin equivalent circuit of the power supply grid is determined. From R and X the gain of the power supply grid is calculated. The calculated gain is applied as a process gain parameter in a voltage controller.

The process illustrated in FIG. 2 will, in an off-line configuration of the present invention, be performed once. Thus, the process gain of the voltage controller is determined its value will not be changed.

In a preferred embodiment of the present invention the process gain is adjusted in an adaptive manner so that the process gain of the voltage controller always matches the characteristics of the power supply grid as seen from the PCC. By configuring the voltage controller in an adaptive manner strict grid code demands may be followed.

Figure 3:
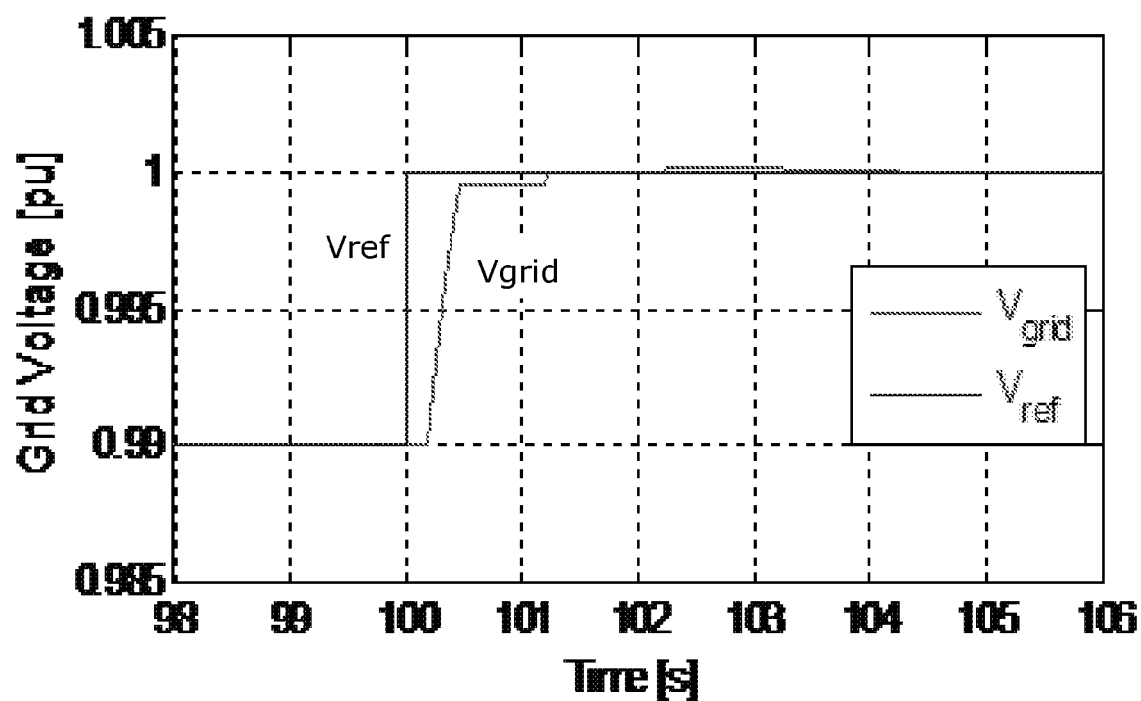
FIG. 3 shows a step response of a feed-forward voltage controller according to the present invention.

FIG. 3 shows a step response of a feed-forward voltage controller according to the present invention. As seen in FIG. 3, the feed-forward controller produces a minimal overshoot. This is an improvement of the dynamic behaviour compared to prior art systems.

The invention claimed is:

1. A method for controlling a voltage level of a power supply grid operationally connected to a source of electrical power, the method comprising the steps of
 determining a first short circuit impedance of the power supply grid at a point of common coupling,
 calculating, using the determined first short circuit impedance, a first gain value of the power supply grid, and
 controlling the grid voltage level in accordance with the calculated first gain value by applying said first gain value as a gain parameter in a voltage controller.

2. A method according to claim 1, wherein the step of controlling the grid voltage level comprises the step of calculating an amount of electrical power to be injected into the power supply grid from the source of electrical power in accordance with the calculated first gain value of the power supply grid.

3. A method according to claim 2, further comprising the step of injecting, from the source of electrical power, the calculated amount of electrical power into the power supply grid in order to control the grid voltage level accordingly.

4. A method according to claim 3, further comprising the steps of
 determining a second short circuit impedance of the power supply grid at the point of common coupling,
 calculating, using the determined second short circuit impedance, a second gain value of the power supply grid, and
 controlling the grid voltage level in accordance with the calculated second gain value by replacing the first gain value with the second gain value as the gain parameter in the voltage controller.

5. A method according to claim 4, wherein the step of controlling the grid voltage level comprises the step of calculating an amount of electrical power to be injected into the power supply grid from the source of electrical power in accordance with the calculated second gain value of the power supply grid, and injecting, from the source of electrical power, the calculated amount of electrical power into the power supply grid in order to control the grid voltage level accordingly.

6. A method according to claim 1, wherein a gain of the power supply grid is defined as a voltage change, $\Delta V$, per electrical power unit, MW or MVAr, injected into the power supply grid.

7. A method according to claim 1, wherein the point of common coupling is positioned along a transmission line connecting the source of electrical power and the power supply grid.

8. A method according to claim 1, wherein the step of determining the short circuit impedance involves measurements of a voltage level and a current level at the point of common coupling.

9. A method according to claim 8, wherein the measured voltage and current levels are associated voltage and current levels.

10. A method according to claim 1, wherein the source of electrical power comprises one or more wind turbines capable of generating electrical power.

11. A method according to claim 1, wherein the source of electrical power comprises a STATCOM.

12. A method according to claim 1, wherein the source of electrical power comprises a source of active power, and wherein the electrical power injected into the power supply grid in order to control the grid voltage level comprises active power.

13. A method according to claim 1, wherein the source of electrical power comprises a source of reactive power, and wherein the electrical power injected into the power supply grid in order to control the grid voltage level comprises reactive power.

14. A method for determining a process gain of a voltage controller for controlling a voltage level of a power supply grid operationally connected to a source of electrical power, the method comprising the steps of determining a short circuit impedance of the power supply grid at a point of common coupling, calculating, using the determined short circuit impedance, a gain value of the power supply grid, and applying said gain value as the process gain of the voltage controller.

15. A method according to claim 14, wherein the point of common coupling is positioned along a transmission line connecting the source of electrical power and the power supply grid.

16. A method according to claim 15, wherein the source of electrical power comprises a source of reactive power.

17. A method according to claim 14, wherein the source of electrical power comprises a source of active power.

18. A method according to claim 14, wherein the source of electrical power comprises a source of reactive power.

19. A method according to claim 14, wherein the step of determining the short circuit impedance involves measurements of a voltage level and a current level at the point of common coupling.

20. A method according to claim 19, wherein the measured voltage and current levels are associated voltage and current levels.

* * * * *